United States Patent
Resic

(10) Patent No.: US 10,433,632 B2
(45) Date of Patent: *Oct. 8, 2019

(54) SHAKER BOTTLE COMPRISING A CONTAINER FOR STORING A POWDER SUPPLEMENT

(71) Applicant: ZiiiP Bottles AB, Malmö (SE)

(72) Inventor: Mevludin Resic, Malmo (SE)

(73) Assignee: ZiiiP Bottles AB, Malmo (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/079,018

(22) PCT Filed: Feb. 22, 2017

(86) PCT No.: PCT/SE2017/000012
§ 371 (c)(1),
(2) Date: Aug. 22, 2018

(87) PCT Pub. No.: WO2017/146625
PCT Pub. Date: Aug. 31, 2017

(65) Prior Publication Data
US 2019/0021474 A1   Jan. 24, 2019

(30) Foreign Application Priority Data
Feb. 26, 2016 (SE) .......................... 1600067

(51) Int. Cl.
*A45F 3/20* (2006.01)
*B01F 15/00* (2006.01)
(Continued)

(52) U.S. Cl.
CPC ............. *A45F 3/20* (2013.01); *A47J 43/27* (2013.01); *B01F 15/0087* (2013.01);
(Continued)

(58) Field of Classification Search
CPC ............. A45F 3/20; A45F 2003/205; A45F 2200/0558; B65D 1/0292; B65D 1/40;
(Continued)

(56) References Cited

U.S. PATENT DOCUMENTS 3,349,966 A * 10/1967 Schwartzman ...... B65D 47/248
206/222
3,441,179 A * 4/1969 Ragan .................. B65D 25/085
222/129

(Continued)

FOREIGN PATENT DOCUMENTS

EP          0263536 A3      3/1989
EP          0287170 A3      4/1990
(Continued)

OTHER PUBLICATIONS

International Search Report. International Application No. PCT/SE2017/000012; dated Apr. 28, 2017. World Intellectual Property Organization; pp. 1-4.

*Primary Examiner* — Charles Cooley
(74) *Attorney, Agent, or Firm* — Mollborn Patents, Inc.; Fredrik Mollborn

(57) ABSTRACT

A shaker bottle having a vessel for retaining a liquid volume, a lid for closing said vessel, a container for storing a powder supplement, and an accessory compartment for storing valuables. The container is releasably arranged to a lower surface of the lid. The vessel is foldable for providing a folded state of the shaker bottle during transportation. The container is received by the bottom of the vessel in the folded state, and thus the release of the container is locked. In an unfolded state the container is released for supply of the powder supplement to the liquid in the vessel, while the container is serving as a stirring device. A method for use of the shaker bottle is provided for securing a safe storing of powder (Continued)

supplements during transportation and for improving the functionality of a shaker bottle for every user with an active lifestyle.

14 Claims, 8 Drawing Sheets

(51) Int. Cl.
    *A47J 43/27* (2006.01)
    *B65D 1/02* (2006.01)
    *A45C 1/02* (2006.01)

(52) U.S. Cl.
    CPC ...... *B65D 1/0292* (2013.01); *A45C 2001/028* (2013.01); *A45F 2003/205* (2013.01); *A45F 2200/0558* (2013.01)

(58) Field of Classification Search
    CPC .. B65D 25/085; A47J 43/27; A45C 2001/028; Y10S 215/90; B01F 15/0087
    USPC .................................. 366/130; 222/566, 572
    See application file for complete search history.

(56) References Cited

U.S. PATENT DOCUMENTS

| | | | | |
|---|---|---|---|---|
| 3,587,937 A | * | 6/1971 | Childs | B65D 1/0292 222/213 |
| 5,335,773 A | * | 8/1994 | Haber | A61J 1/2093 206/219 |
| 5,384,138 A | | 1/1995 | Robbins et al. | |
| 5,531,353 A | | 7/1996 | Ward et al. | |
| 5,794,802 A | * | 8/1998 | Caola | A61J 1/2093 206/219 |
| 5,950,819 A | | 9/1999 | Sellars | |
| 6,257,428 B1 | * | 7/2001 | Caola | A61J 1/2093 206/219 |
| D802,349 S | * | 11/2017 | Resic | D7/300.1 |
| 2006/0016819 A1 | | 1/2006 | Paslawski et al. | |
| 2009/0188884 A1 | | 7/2009 | Nelson et al. | |
| 2010/0163509 A1 | | 7/2010 | Hoffa et al. | |
| 2011/0303659 A1 | | 12/2011 | Perlman | |
| 2013/0181000 A1 | * | 7/2013 | Miksovsky | A45F 3/20 220/780 |
| 2014/0332528 A1 | | 11/2014 | Blum et al. | |
| 2015/0250349 A1 | | 9/2015 | Ng et al. | |
| 2019/0021474 A1 | * | 1/2019 | Resic | B65D 1/0292 |

FOREIGN PATENT DOCUMENTS

| | | |
|---|---|---|
| EP | 2356033 B1 | 10/2012 |
| GB | 2501755 A | 11/2013 |
| GB | 2521895 B | 12/2015 |
| JP | 2010260589 A | 11/2010 |
| WO | 9415846 A1 | 7/1994 |
| WO | 9737841 A1 | 10/1997 |
| WO | 0210027 A1 | 2/2002 |
| WO | 2004014739 A2 | 5/2004 |
| WO | 2011055152 A1 | 5/2011 |
| WO | 2011133854 A3 | 4/2012 |
| WO | 2012096990 A3 | 10/2012 |

* cited by examiner

SHAKER BOTTLE COMPRISING A CONTAINER FOR STORING A POWDER SUPPLEMENT

TECHNICAL FIELD

The present invention relates to a shaker bottle comprising a vessel for retaining a liquid volume having a bottom, and an open top, a lid for closing said vessel at the open top, and a container for storing a powder supplement that is intended to be mixed with the liquid in the vessel and consumed by a user.

Also, the invention relates to a method for use of a shaker bottle.

BACKGROUND

Many people have an active lifestyle which means that they are engaged in and are practicing a sport or fitness activity almost every day in life, where the health awareness aspect is in common for all.

The reason or motivation behind their engagement could be very different, for example body physic improvement, performance enhancement, weight loss, or just activity enjoyment. These frequent activities need time planning, e.g. for families with children at school and parents at work. Many persons pack and bring their gym bag in the morning for heading to the gym or sports field straight after school or work.

Powder supplements, such as protein supplements, meal replacement meals and nutritional additives are commonly used to increase performance and to support building of muscles both among professional sportsmen, athletes, bodybuilders and ordinary people training at the gyms and fitness-centers.

Consumers of powder supplements often purchase large containers or bulk quantities of such powders. A small single serving portion of the powders should be combined with water or other suitable liquid for consumption. It is recommended by the suppliers that the protein supplements should not be mixed in advance of the consumption as protein can denature in water over time. Because of this, the consumers have to bring one or several small portions of powder in plastic bags or in separate containers to be added to water in a water bottle at the job site or school before the activity, or after the workout at the gym. If an ordinary water bottle is used, often clumps of protein powder will remain unsolved in the liquid mixture, and a smooth textured drink is not obtained despite intense shaking of the bottle.

The patent document SE 534 145 describes a shaker for storing, transportation and mixing powder supplements with a liquid. The shaker comprises an ordinary vessel and one or more removable compartments for storing powders and additional capsules, which are attached to a bottom of the vessel. The vessel comprises a cone shaped mesh arranged at the top of the vessel that is intended for mixing the powder with the liquid. The compartments have to be removed from the bottom of the vessel for adding the powder to the liquid or for taking out the capsules.

The patent application US 2015/0250349 describes a shaker bottle having an open top vessel for retaining a liquid and a lid assembly for closing the vessel. The lid assembly comprises a storage chamber for keeping powder supplements and a releasable bottom member for sealing the storage chamber, thus separating the storage chamber from the liquid in the vessel. The powder is added to the liquid of the vessel when the bottom member is released, wherein the bottom member acts as a mixing ball.

Also, different shaker bottles are presented that comprise a kit of accessories such as one or several separate containers for storing powder supplements and additional pills or capsules, and separate plastic or steel devices, e.g. a wire ball or a steel spring for mixing the powder with liquid. Such shaker bottles are bulky in a bag due to several different parts. Also, the contamination risk of the interior of such bottles is obvious, since several parts are kept outside the shaker bottle at transportation, and thereafter is positioned within the shaker bottle at use.

The existing shaker bottles on the market have limitations regarding e.g. bulkiness at transportation, the hygienic aspect, and the functionality in regard to store of powder supplements and the mixing procedure.

There is a demand from athletes and ordinary active people to get rid of the inconvenience of bringing a bulky shaker bottle and accessories from one location to another, and to find a shaker bottle that is functional and easy to handle for supporting an effective and time saving way to perform both at work or school and at the gym or sports arena.

Hence, an improved shaker bottle for athletes and ordinary active persons for supply of liquid and nutrient or powder supplements would be advantageous.

SUMMARY OF THE INVENTION

An object of the present invention is to mitigate or eliminate one or more deficiencies and disadvantages of the prior art, such as the above-identified, singly or in any combination, by providing a shaker bottle and a method for use of the shaker bottle according to the appended patent claims.

In a first aspect the invention relates to a shaker bottle for use by athletes and ordinary active people for supply of liquid as a drinking bottle, or for supply of nutrients or powder supplements mixed with liquid.

In a second aspect the invention relates to a method for use of the shaker bottle, especially when powder supplements or nutrients should be mixed with a liquid.

A more specific object of the present invention is to provide a shaker bottle having a folded state and an unfolded state, wherein the storing of powder supplements in a container is secured during transportation and at use as an ordinary liquid bottle, and the supply of powder supplements to a liquid is providing a well-mixed drink by means of the container serving as a stirring device.

The shaker bottle comprises a vessel for retaining a liquid volume which has a bottom, and an open top, a lid for closing said vessel at the open top, and a container for storing a powder supplement, wherein the container is releasable arranged to means fixed to a lower surface of the lid and the vessel is foldable for providing a folded state of the shaker bottle during transportation.

The container has a cylindrical shape with a bottom and an open top, which is closed by the lower surface of the lid when arranged to the means, and comprises a protrusion integrally made with said bottom, which faces the lower surface of the lid.

The lid comprises a webbing, which is arranged in abutment with the protrusion of the container when the container is arranged to the means of the lid, and a button that is arranged on the webbing and is protruding upwardly through a bore of the lid. The container is released when the button is pressed. Then, the powder supplement is supplied to the liquid in the vessel while the container is serving as a stirring device in the unfolded state of the shaker bottle. The webbing is made of a softer material than the material of the lid and the button.

The vessel is cone shaped with a larger diameter at the open top than at the bottom. The vessel has a surface area between the top and the bottom comprising several horizontal sections with grooves arranged between each of the sections for providing the folded state of the shaker bottle, when a pressure is applied on the top of the vessel. The grooves have a smaller thickness than a thickness of the sections.

In a preferred embodiment the vessel has five sections, of which a first section arranged close to the bottom of the vessel is in abutment with a second section, and the second section is in abutment with a third section, and the third section is in abutment with a fourth section, and the fourth section is in abutment with a fifth section. The fifth section is surrounding the first, the second, the third and the fourth sections and is in engagement with the lid when the shaker bottle is in the folded state. The fifth section has threads for engagement with threads of the lid.

The bottom of the container is received by the bottom of the vessel in the folded state, when being arranged to the lower surface of the lid. Thus, the release of the container is locked in the folded state of the shaker bottle.

The shaker bottle has a base integrally made with the bottom of the vessel. Further, the shaker bottle comprises an accessory compartment with a bottom and an open top, which is removable arranged at the base and which is closed by the bottom of the vessel. According to one embodiment threads are arranged around the base for engagement with threads of the accessory compartment. According to another embodiment a connecting ring is arranged around the base for engagement with the accessory compartment.

The lid comprises an aperture and a channel for connecting the aperture with the liquid volume in the vessel, where the aperture is arranged at a side portion of the lid. The shaker bottle has a cap for closing the aperture, where the cap is arranged in engagement with a hook of the lid mounted below the aperture forming a flexible joint.

The container has a smaller diameter than the lower surface of the lid forming a space around the container, which enable liquid in the vessel to pass through the channel and to the aperture for use of the shaker bottle as an ordinary liquid bottle in the unfolded state.

A method for use of a shaker bottle comprises the step of providing a shaker bottle that comprises a foldable vessel for retaining a liquid volume having a bottom, and an open top, a lid for closing said vessel at the open top, and a container for storing powder supplement. Further steps are filling the container with the powder supplement and arranging it at means fixed at a lower surface of the lid, and then closing the shaker bottle by bringing the lid in engagement with the top of the vessel. Further, the vessel is folded by applying a pressure on the top of the vessel, where the container is received by the bottom of the vessel in the folded state thus locking a release of the container. Thereafter, the shaker bottle is transported to a location for use, and the vessel is unfolded by gripping the vessel at the top and the bottom and is then pulled to the unfolded state. The lid is removed for filling a liquid into the vessel and is then closed again by the lid. Thereafter the aperture is opened by removal of the cap for drinking the liquid.

Further, the method comprises the step of pressing the button of the lid for releasing the container and thus supplying the powder supplement to the liquid, which is done when the aperture is closed by the cap. Then, the shaker bottle is shaken for mixing the powder with the liquid while the released container is serving as a stirring device. For drinking the liquid mixed with the powder supplement the aperture is opened by removing the cap.

The method further comprises the steps of providing an accessory compartment, and putting coins, keys, or additional items therein for storing these, then the accessory chamber is arranged at a base of the shaker bottle.

Further objects, features and advantages of the present invention will appear from the following detailed description, the attached drawings and the appended claims.

BRIEF DESCRIPTION OF THE DRAWINGS

In order to explain the invention, embodiments of the invention will be described below with reference to the drawings, in which.

Same reference numerals have been used to indicate the same parts in the figures to increase the readability of the description and for the sake of clarity.

DETAILED DESCRIPTION

Specific embodiments of the invention will now be described with reference to the accompanying drawings. This invention may be embodied in many different forms and should not be construed as limited to the embodiments set forth herein; these embodiments are provided so that this disclosure will be thorough and complete, and will fully convey the scope of the invention for those skilled in the art. The terminology used in the detailed description of the embodiments illustrated in the accompanying drawings is not intended to be limiting of the invention.

Figure 1:
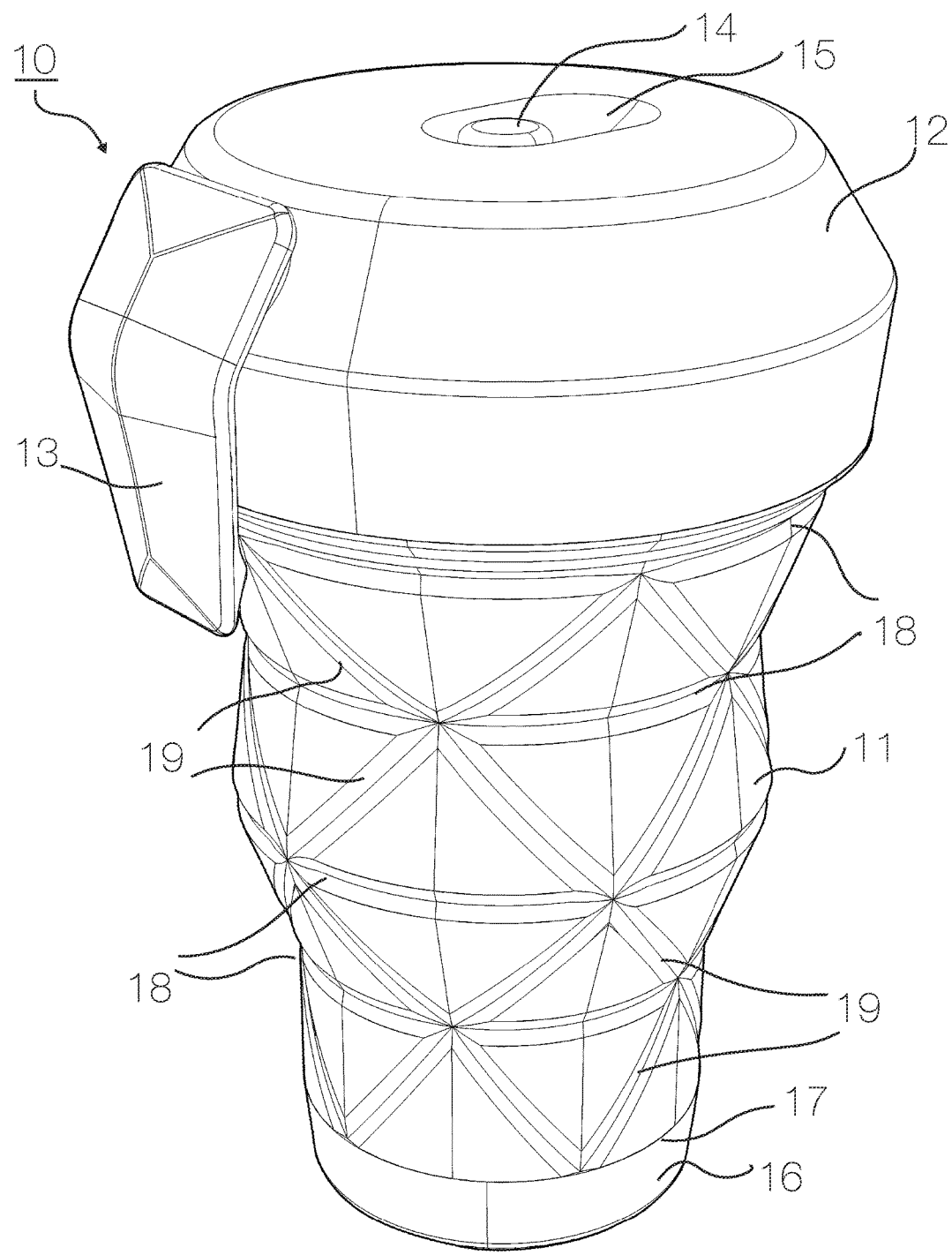
FIG. 1 is a perspective view of a shaker bottle in an unfolded state according to the invention comprising a lid having an aperture closed by a cap, a vessel, a container for powder supplement mounted to a lower surface of the lid, and an accessory compartment arranged to a bottom of the vessel, where decorations are arranged on a surface area of the vessel.

FIG. 1 shows a perspective view of a shaker bottle 10 in an unfolded state. The shaker bottle comprises a vessel 11 for retaining a liquid volume, a lid 12 for closing said vessel 11 at an open top thereof (shown in FIG. 3), and a container 31 for storing a powder supplement (shown in FIG. 3).

The lid 12 has an aperture 21 (shown in FIG. 2), which is arranged at a side portion of the lid 12 and which is closed by a cap 13. Further, the lid 12 comprises a button 14 for release of the container 31. The button 14 is arranged on a webbing 42 (shown in FIG. 4) and protrudes upwardly through a bore in the lid 12. A recess 15 is arranged in an upper surface of the lid 12 for enabling the button 14 to be arranged on the webbing 42 without protruding beyond the upper surface of the lid 12 and yet to be easily accessed. The release function of the container is explained in detail in connection with FIG. 6-8.

Further, the shaker bottle 10 comprises an accessory compartment 16 for storing coins, keys, and other valuables, which is arranged at a bottom 17 of the vessel 11.

The vessel 11 has several grooves 18 arranged around its surface area for enabling the vessel to be folded, which will be explained below.

The shaker bottle 10 has decorations 19 arranged on the vessel 11. These decorations 19 can be arranged as different patterns, e.g. a diamond pattern, or as other patterns of triangular or polygonal form. In an alternative embodiment these decorations can be omitted.

Figure 2:
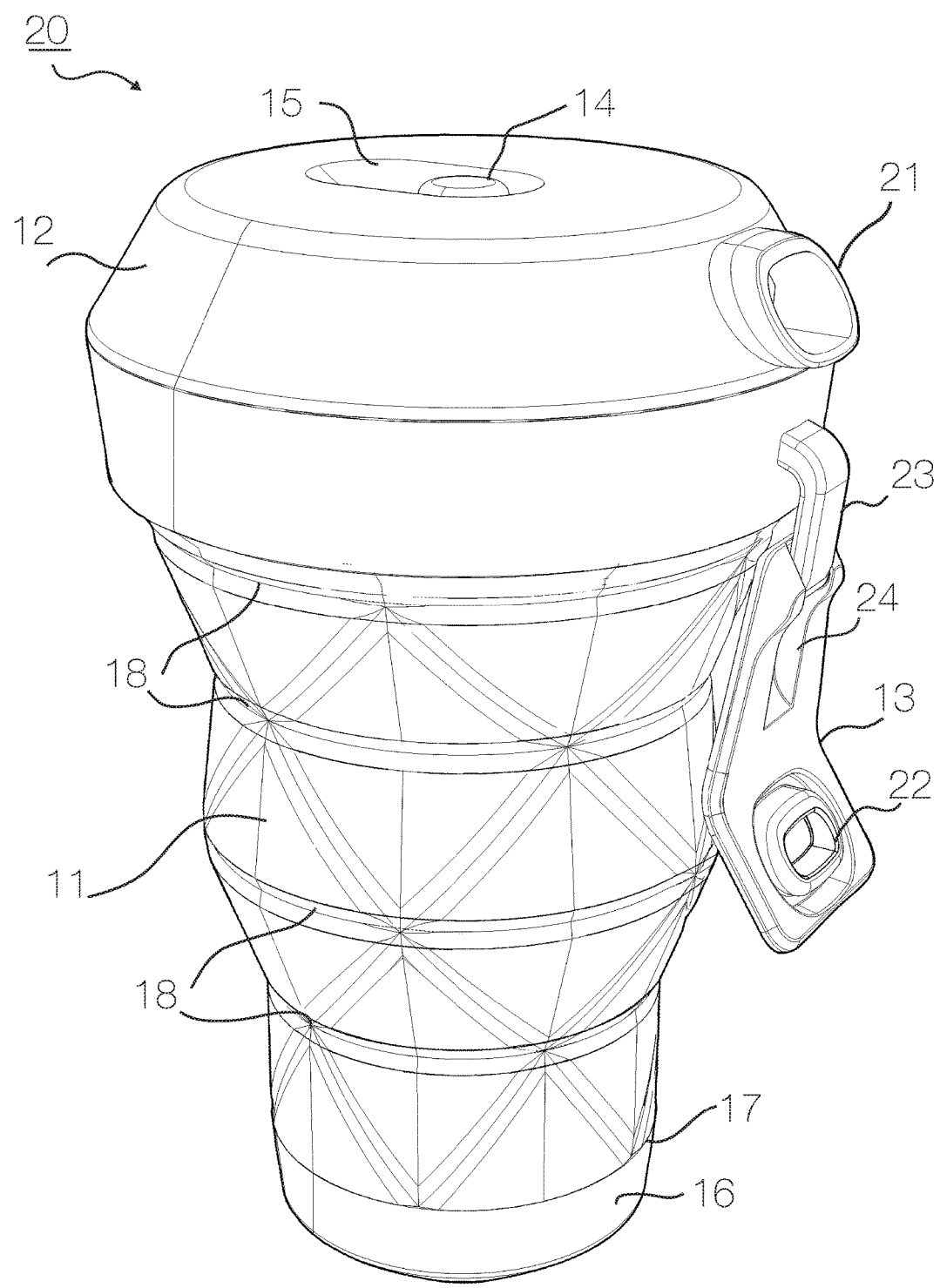
FIG. 2 is a perspective view of the shaker bottle in FIG. 1 with the aperture of the lid open, and without decorations on the vessel.

FIG. 2 shows a shaker bottle 20 configured as the shaker bottle 10 and comprising the same components and features, but without decorations 19. The shaker bottle 20 is shown with an open aperture 21 of the lid 12.

The cap 13 for closing the aperture 21 has a part 22 for engagement with the aperture 21. In the embodiment shown, the part 22 is a male part with a race track shape for engagement with the aperture 21, which is a female part of corresponding shape. A sealing may be provided around the part 22 for eliminating any risk of leakage when the vessel 11 contains liquid while the aperture 21 is closed.

The cap 13 is connected to a hook 23, which is arranged below the aperture 21 on a side portion of the lid 12. The hook 23 has a bulb 32 (shown in FIG. 3) at a free end thereof, which is brought in engagement with a track 24 of the cap 13 for forming a flexible joint between the hook 23 and the cap 13.

Figure 3:
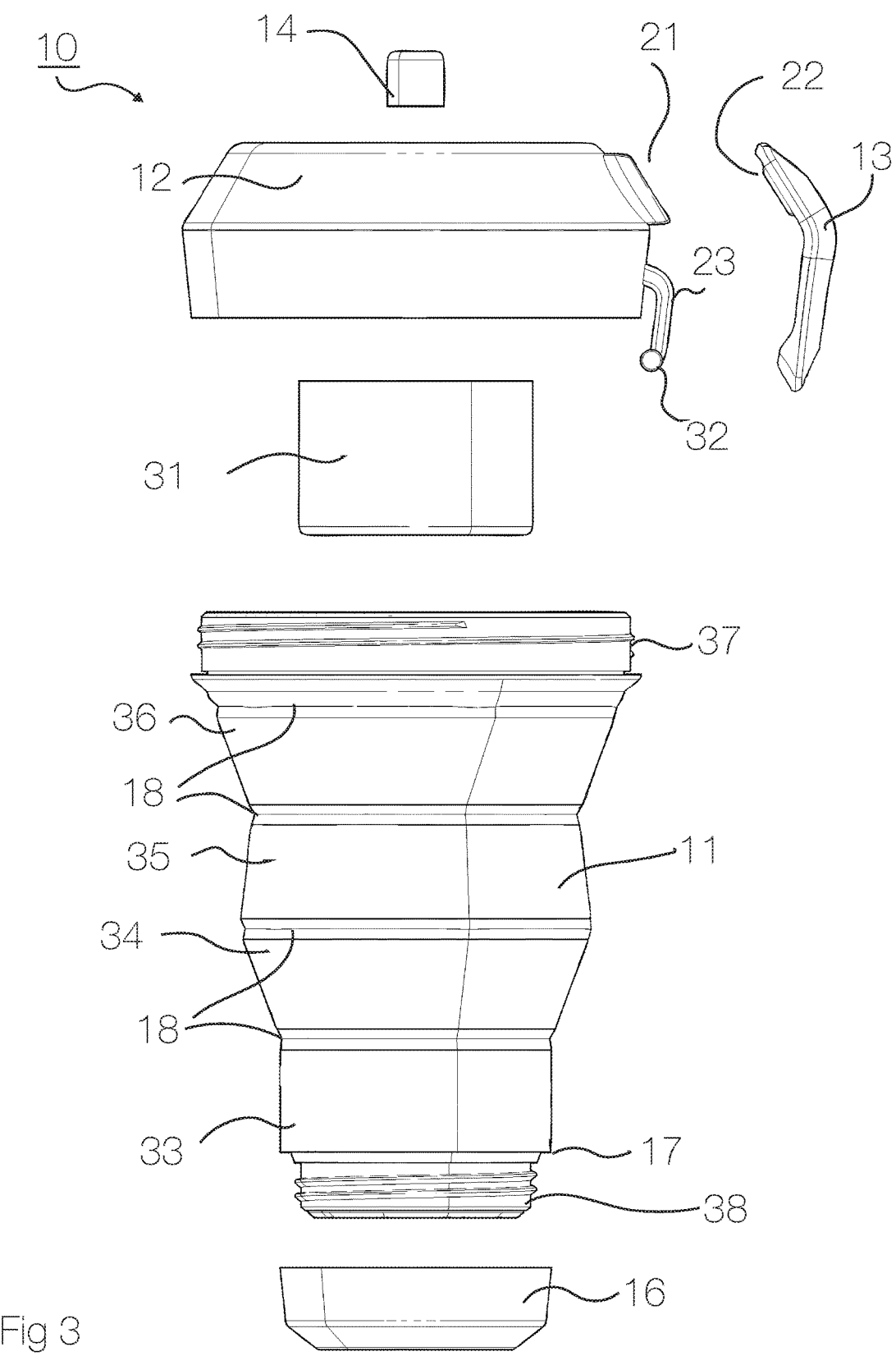
FIG. 3 is an exploded front view of the shaker bottle showing a release button, the lid with the aperture opened and the cap removed from a hook of the lid, the container for storing powder supplement, the vessel and the accessory compartment.

FIG. 3 is an exploded front view of the shaker bottle 10, 20, which shows the separate components of the shaker bottle: the button 14 for release of the container 31, the lid 12 removed from the vessel 11 and with the aperture 21 opened, the cap 13 for closing the aperture 21, the hook 23 with the bulb 32 for engagement with the track 24 of the cap 13, the container 31 for storing powder supplement, the vessel 11 for retaining a liquid volume, and the accessory compartment 16.

The vessel 11 is generally cone shaped with a larger diameter at the open top than at the bottom 17. The surface area between the top and the bottom 17 of the vessel 11 comprises horizontal sections 33, 34, 35, 36, 37 with grooves 18 arranged between these sections. The grooves 18 have a smaller thickness than a thickness of the sections 33, 34, 35, 36, 37. In a preferred embodiment there are five sections 33, 34, 35, 36, 37 and four grooves 18.

The first section 33, arranged close to the bottom 17 of the vessel 11, has a cylindrical shape, and the second section 34 is cone shaped being narrow close to the first section 33 and broad close to the third section 35. The third section 35 is tapered being broad close to the second section 34 and narrow close to the fourth section 36. The fifth section 37 at the open top of the vessel 11 has a cylindrical shape and is adapted for connection with the lid 12. The folding function will be explained below.

In a preferred embodiment, threads are arranged around the section 37 for engagement with threads arranged at the lid 12. According to an alternative embodiment, other connecting means may be provided, such as means for press fitting between the section 37 and the lid 12.

Further, the shaker bottle 10, 20 comprises a base 38 integrally made with the bottom 17 of the vessel 11. The accessory compartment 16 comprises a bottom and an open top, and is closed by the bottom 17 of the vessel 11 when detachable mounted to the base 38.

Figure 4:
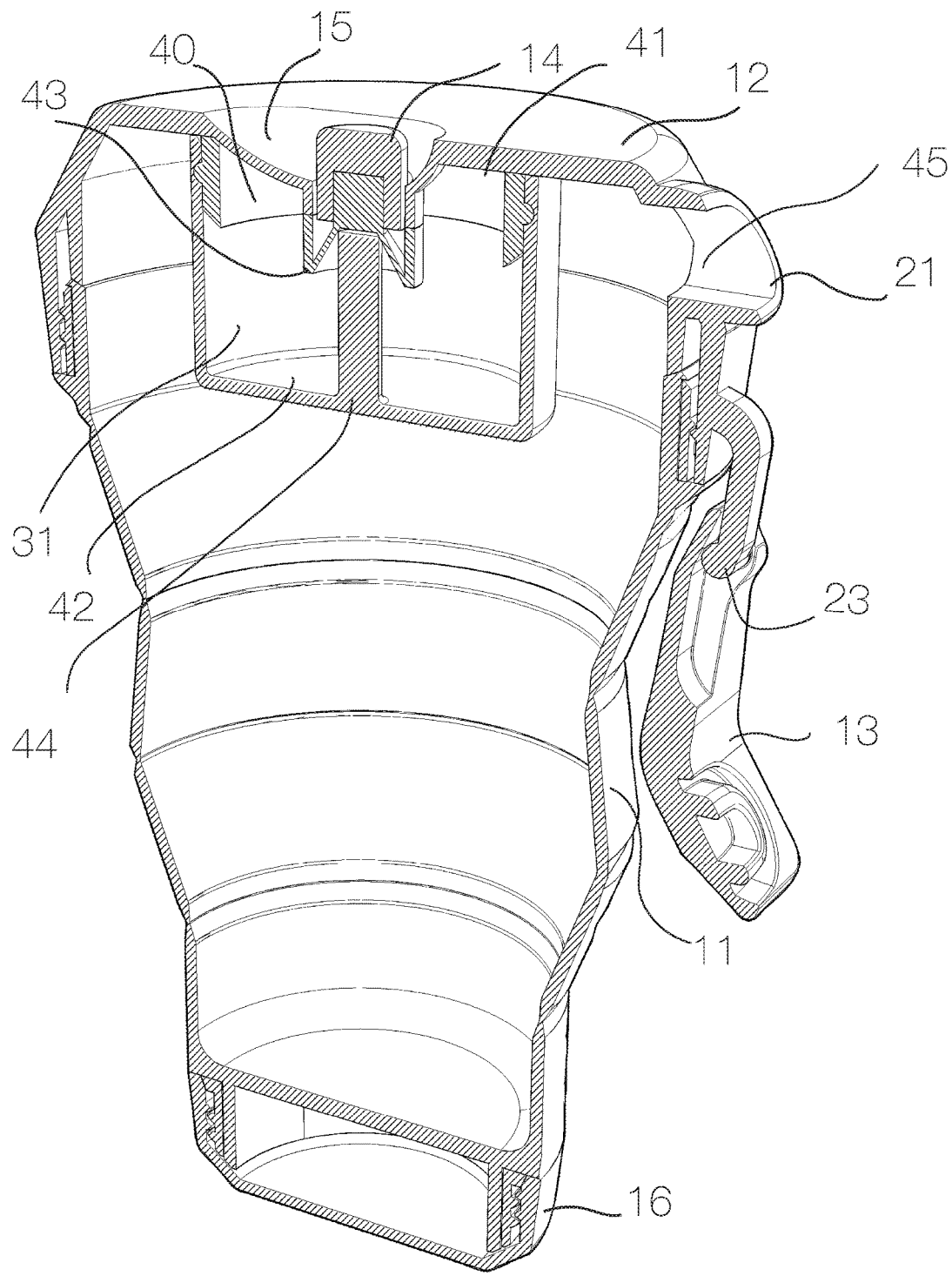
FIG. 4 is a perspective section view of the shaker bottle having the aperture of the lid open, showing the container arranged to means at a lower surface of the lid, a channel for liquid passage from the vessel to the aperture and the cap in engagement with the hook.

A connecting ring (as shown in FIG. 4) with threads is arranged around the base 38, which is brought into engagement with threads of the accessory compartment 16. In an alternative embodiment, the ring is omitted and threads are arranged around the base 38 for engagement with threads of the accessory compartment. In yet another embodiment, the ring is omitted and a press fitting is provided between the base 38 and the accessory compartment 16, and thus the threads are eliminated.

The vessel 11 and the base 38 are made of a silicone material, or a thermoplastic material of a soft quality.

FIG. 4 is a perspective section view of the shaker bottle 10, 20 with the aperture 21 of the lid open.

The container 31 for storing powder supplement is releasable arranged to means 40, which are fixed to a lower surface 41 of the lid 12. According to a first embodiment the means 40 is configured as an annular member having a rim for engagement with a slot of the container, as shown in FIG. 4.

The container and the annular member, respectively, are made of a polymeric material. In a first embodiment the annular member is made of a softer material than the material of the container since the materials have to cooperate to reach a tight sealing between each other. According to a second embodiment the means 40 could be configured for acting as a press fitting with the container 31. In the second embodiment the means 40 is made of a softer material than the material of the container, or the means 40 is made of a harder material than the material of the container 31, resulting in a tight sealing between each other.

The container 31 has a cylindrical shape with a bottom 42 and an open top and is closed by the lower surface 41 of the lid 12, when the container is arranged to the means 40. The container 31 comprises a protrusion 44, which is integrally made with the bottom 42 and is facing to the lower surface 41 of the lid.

The webbing 43 is arranged to the lower surface 41 of the lid 12 and in abutment with the protrusion 44 of the container 31. The button 14 is arranged on the webbing 43 and is protruding through a bore of the lid 12.

The webbing 43 is resilient, and is made of a softer material than the material of the lid and the button. The webbing is made of a thermoplastic material or a silicone material. The lid and the button are made of a thermoplastic material or a copolymer. The means 40 for engagement with the container 31 is made of a softer material than the lid 12. The webbing and the means 40 is made in a two shot or a multi shot molding process for arrangement to the lid 12 as known per se.

The lid 12 has a channel 45 for passing the liquid from the vessel 11 to the aperture 21. The container 31 has a smaller diameter than a diameter of the lower surface 41, thus there is a space around the container 31 for enable liquid to pass from the vessel 11 and through the channel 45 and to the aperture 21 when the container is attached to the means at the lid.

Figure 5:
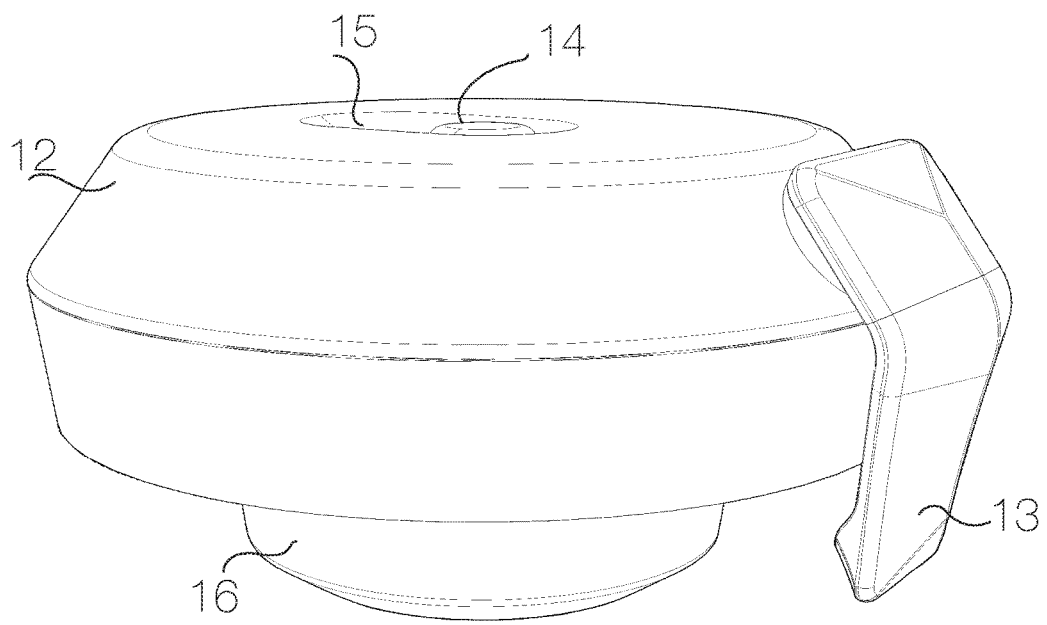
FIG. 5 is a perspective view of the shaker bottle in a folded state, wherein the container for powder supplement is received by the bottom of the vessel.

FIG. 5 is a perspective view of the shaker bottle 10, 20 in a folded state. This state is provided due to the sections 33, 34, 35, 36, 37 of the vessel 11 and the grooves 18 between these sections, which enable the vessel 11 to be folded. The folded state is provided when a pressure is applied on the top of the lid or on the top of the vessel if the lid is detached from the vessel. In the folded state, the sections of the vessel are arranged in such way that the first section which is arranged close to the bottom 17 of the vessel is in abutment with the second section, and the second section is in abutment with the third section, and the third section is in abutment with the fourth section, and the fourth section is in abutment with the fifth section. Further in the folded state, the fifth section is surrounding the first, second, third, and fourth sections and is in engagement with the lid.

In the folded state the bottom 42 of the container 31 is received by the bottom 17 of the vessel 11, resulting in that the release function of the container 31 is locked. The folded state secures an unintended release of the container 31, for example at movement of the shaker bottle 10, 20 before filling liquid into the vessel 11, or during transportation when the shaker bottle is kept in a bag.

The release function of the container 31 is explained in connection with FIG. 6-8.

Figure 6:
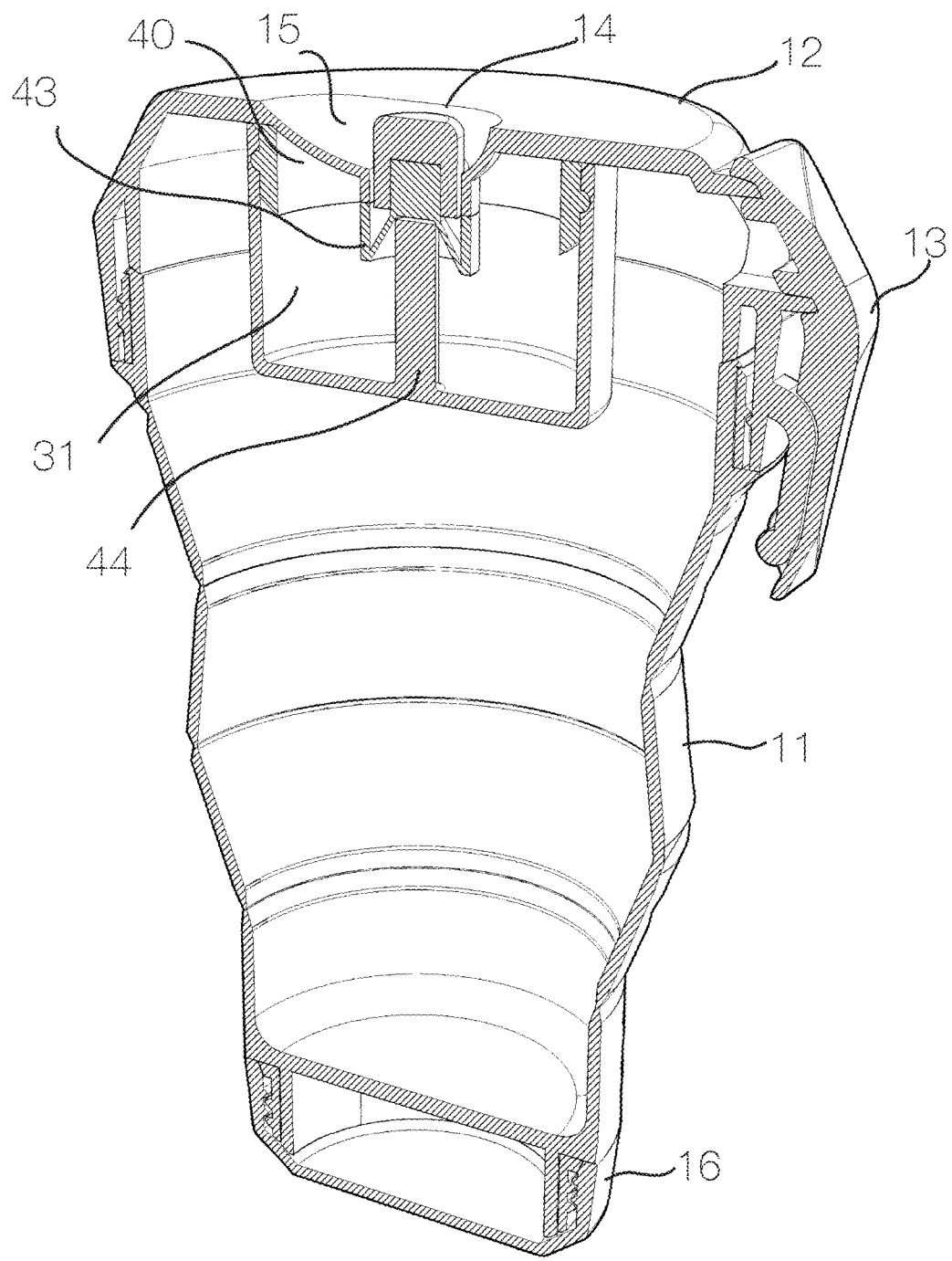
FIG. 6 is a perspective section view of the shaker bottle showing the container for powder supplement mounted to means of the lid.

FIG. 6 shows a perspective section view of the shaker bottle 10, 20 having the container 31 for storing powder supplement mounted to the means 40. The open top of the container 31 is sealed by the lower surface 41 of the lid 12. The button 14 of the lid 12 is arranged on the webbing 43, which is in abutment with the protrusion 44 of the container 31. By applying a pressure to the button 14, the resilient webbing is activated and the pressure is forwarded to the protrusion 44 of the container 31.

Figure 7:
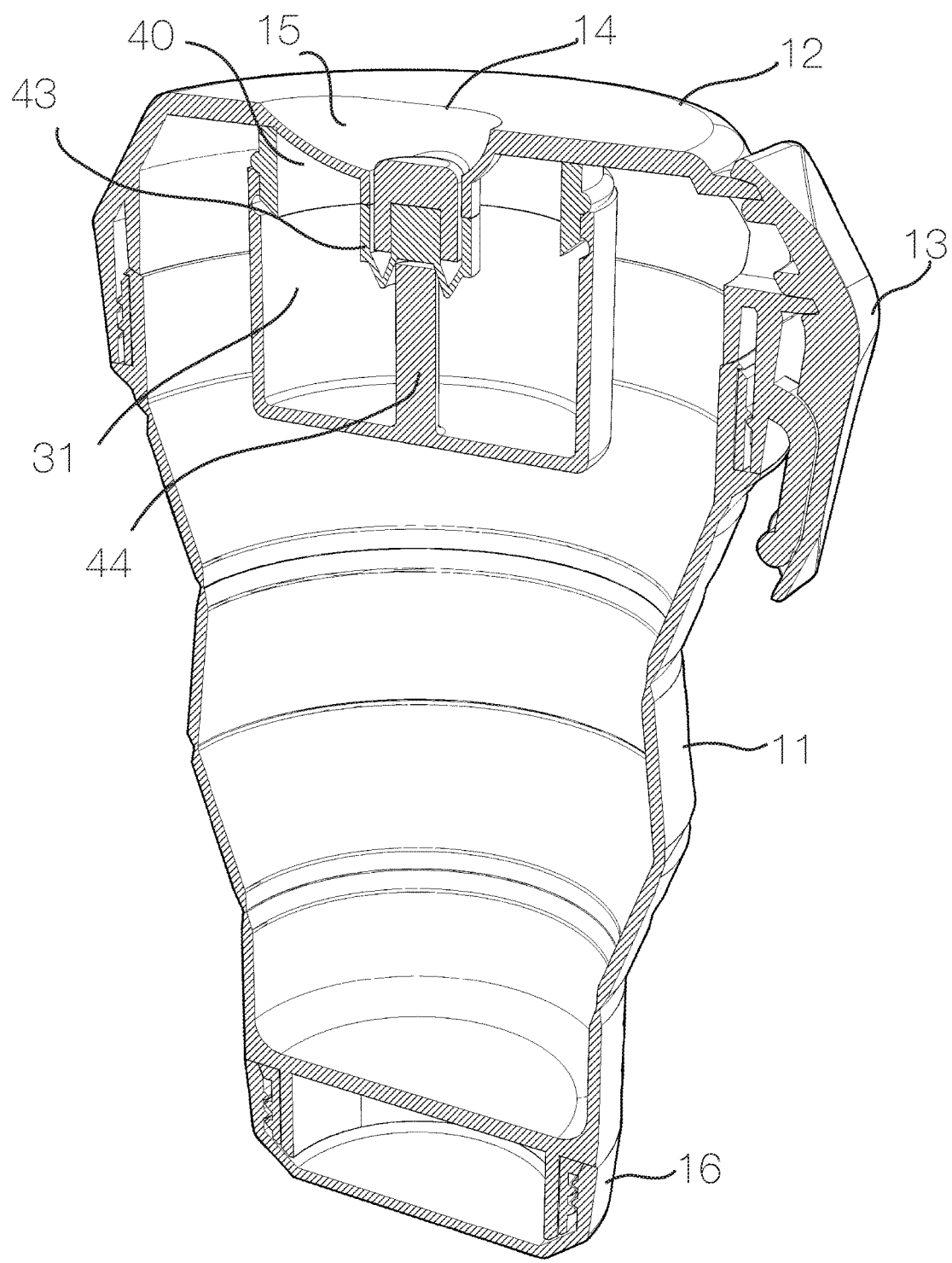
FIG. 7 is a perspective section view of the shaker bottle illustrating that the container for powder supplement has started to be released from the means of the lid.

FIG. 7 shows that the container 31 has started to be released from the means 40 due to the pressure applied to the button 14.

Figure 8:
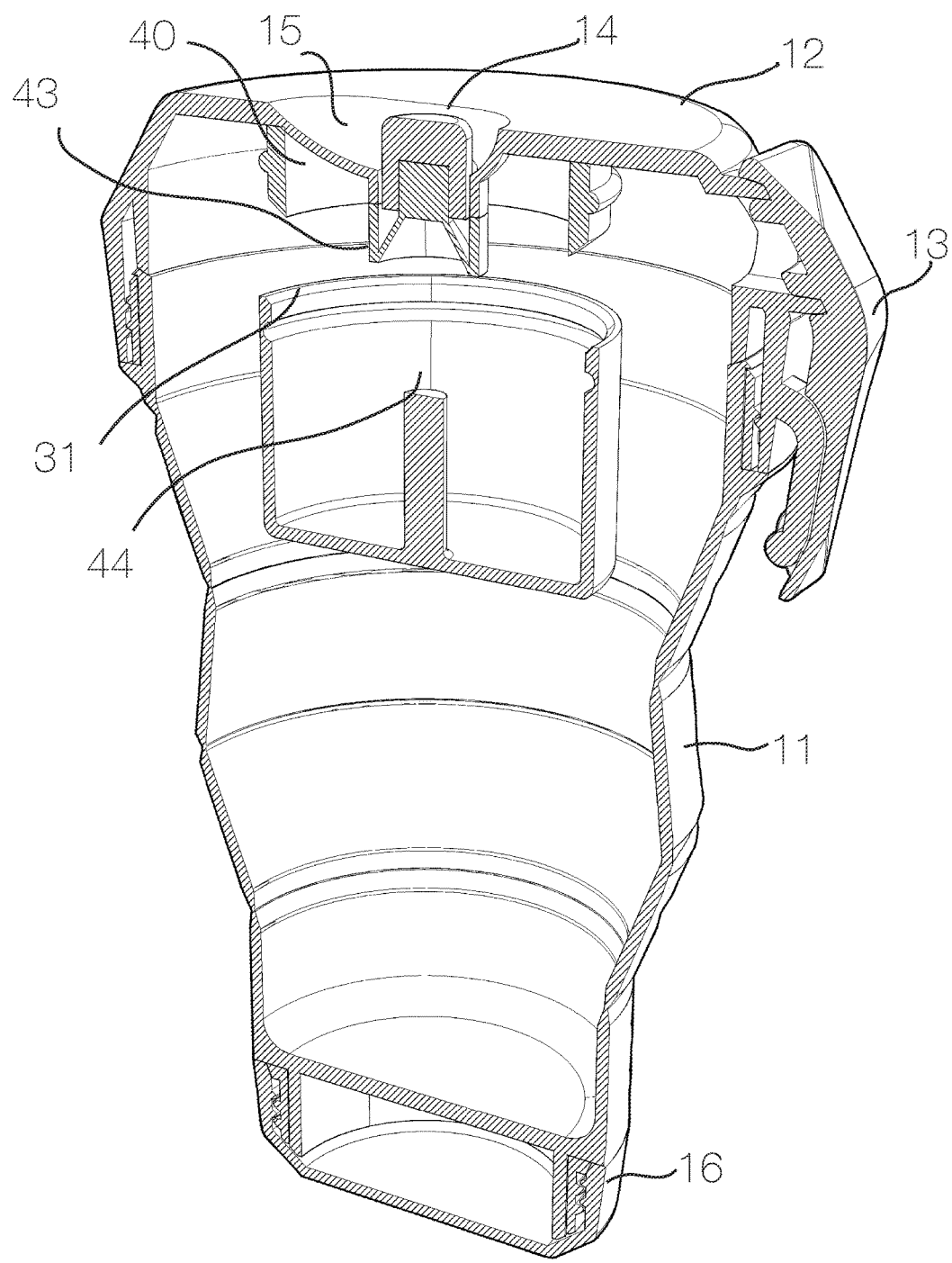
FIG. 8 is a perspective section view of the shaker bottle showing that the container for powder supplement is released and is positioned within the vessel.

FIG. 8 shows the container 31 fully released from the means 40 and positioned within the vessel 11. When the container is released, the powder stored therein is supplied to the liquid volume within the vessel 11. By shaking the shaker bottle 10, 20, the powder is mixed with the liquid while the container 31 serves as a stirring device for improving the mixing procedure.

A method for use of the shaker bottle 10, 20 comprising the components and features as described in connections with FIG. 1-8 will now be disclosed.

A first step is to provide the shaker bottle 10, 20 comprising a foldable vessel 11 for retaining a liquid volume having a bottom 17 and an open top, a lid 12 for closing said vessel at the open top, and a container 31 for storing powder supplement. Then, the container is filled with powder supplement, and is arranged to means 40 at a lower surface 41 of the lid. Thus, the container is sealed by said lower surface in order to keep the powder within the container until it is intended to be mixed with a liquid in the vessel. The open top of the vessel is closed by bringing the lid in engagement with the top of the vessel.

The next step is to bring the shaker bottle in the folded state. By applying a pressure on the lid, the sections 33, 34, 35, 36, 37 of the vessel are arranged around each other due to the grooves 18 resulting in a folded vessel. Thus, the folded state of the shaker bottle is obtained, in which the release function of the container is locked due to that the bottom of the container is received by the bottom of the vessel while being arranged to the means at the lid. This is important during transportation of the shaker bottle since most powder supplements preferably should be mixed with liquid just before intake.

Then, the accessory compartment is provided and is arranged to the bottom of the vessel when it is folded. Optionally, the accessory compartment can be arranged before the vessel is folded.

The shaker bottle in the folded state can be transported without occupying a large space within a bag, portfolio or backpack, and with the powder supplements safely stored in the container.

At the moment for use, the shaker bottle is brought into the unfolded state by gripping the vessel at the top and at the bottom, and then the vessel is pulled to its unfolded state. Liquid is supplied into the vessel after removal of the lid, then the lid is rearranged in engagement with the vessel and the shaker bottle is ready for use.

By applying a pressure to the button, the resilient webbing is activated and the pressure is forwarded to the protrusion of the container, which is released and positioned within the vessel. Thus, the powder supplement is supplied to the liquid in the vessel. By shaking the vessel, the powder supplement is mixed with the liquid while the container is serving as a stirring device. The content of the shaker bottle can be consumed through the aperture at the lid after opening the cap.

Also, the shaker bottle may be used as an ordinary drinking bottle before supply of the powder to the liquid, since liquid in the vessel can freely pass to the aperture without release of the container.

Coins, keys, or additional valuables can be kept in the accessory compartment during work-outs, which affords safe storing of valuables within the range of the owner.

An advantage of the invention is that the shaker bottle in the folded state can be transported without occupying a large space within a bag, portfolio or backpack.

A further advantage is that the shaker bottle according to the invention enables safe storing of the powder supplement within the container during movement, since the release function is locked in the folded state of the shaker bottle.

Yet another advantage of the invention is that the powder supplement when added to a liquid is properly mixed with the liquid by means of the released container serving as a stirring device.

Also, an advantage of the shaker bottle is that it is easy to change from the unfolded state to the folded state, and vice versa, which affords possibilities to use the shaker bottle as an ordinary water bottle or for any other drinks or for nutrient supplements during the day despite of activity or location of the user.

One more advantage is that the arrangement of the cap in engagement with the hook that is mounted below the aperture provides a comfortable position of the cap in relation to the mouth of the user without being an obstacle when drinking. Contrary, shaker bottles on the market have the aperture and the cap arranged on the top of the lid, which results in that the cap fall into the front head of the user when drinking.

Another advantage is that the shaker bottle can be arranged to a belt or a bag, e.g. a shoulder bag, due to the hook, which enables easy access to the shaker bottle.

A further advantage is that the shaker bottle according to the invention provides a large flexibility for people having an active lifestyle.

In summary the shaker bottle improves and supports the active lifestyle for every user.

The description above shall be considered as an exemplification of the principles of the invention and are not intended to limit the invention to the specific embodiments as illustrated. Other embodiments than the ones described can exist within the scope of protection, for example an alternative embodiment of the shaker bottle can have another design of the decorations, such as having recessions forming a triangular, rectangular or polygonal decoration pattern. These decorations may be configured in such way that they may contribute to an easier folding of the shaker bottle.

Further, it should be understood that the container for storing powder supplements also relates to store supplements in liquid phase or as a gel.

It should be emphasized that the term "comprise/comprising" when used in this specification is taken to specify the presence of stated features, integers, steps, or components, but does not exclude the presence or additions of one or more other features, other elements or steps. Reference signs in the claims are provided as clarifying examples and shall not be construed as limiting the scope in any way.

What is claimed is:

1. A shaker bottle (10, 20) comprising:
    a vessel (11) for retaining a liquid volume, the vessel (11) having a bottom (17) and an open top;
    a lid (12) for closing said vessel (11) at the open top; and
    a container (31) for storing a powder supplement,
    wherein
    the container (31) has a cylindrical shape with a bottom (42) and an open top that is closed by a lower surface (41) of the lid (12) when the container is arranged to means (40) fixed to the lower surface (41) and is releasably arranged to the means; and
    the container (31) comprises a protrusion (44) integrally made with the bottom (42), which faces the lower surface (41) of the lid (12); and
    the lid (12) comprises a webbing (43), which is arranged in abutment with the protrusion (44) of the container (31) when the container (31) is arranged to the means (40) of the lid (12), a button (14) that is arranged on the webbing (43) and is protruding upwardly through a bore of the lid (12), the container (31) being released when the button (14) is pressed, and an aperture (21) and a channel (45) for connecting the aperture (21) with the liquid volume in the vessel (12), the aperture (21) being arranged at a side portion of the lid (12); and
    the vessel (11) is foldable for providing a folded state of the shaker bottle (10, 20), wherein the container (31) is received by the bottom (17) of the vessel (11) in the folded state when arranged to the means (40).

2. The shaker bottle (10, 20) according to claim 1, where the webbing (43) is made of a softer material than the material of the lid (12) and the material of the button (14).

3. The shaker bottle (10, 20) according to claim 1, where the container (31) is supplying the powder supplement to the liquid in the vessel (11) at release and is serving as a stirring device in an unfolded state of the shaker bottle (10, 20).

4. The shaker bottle (10, 20) according to claim 1, wherein the vessel (11) is cone shaped with a larger diameter at the open top than at the bottom (17), and has a surface area between the top and the bottom comprising several horizontal sections (33, 34, 35, 36, 37) with grooves (18) arranged between each of the sections (33, 34, 35, 36, 37) for providing the folded state of the shaker bottle (10, 20) when a pressure is applied on the top of the vessel (11).

5. The shaker bottle (10, 20) according to claim 4, wherein the grooves (18) have a smaller thickness than a thickness of the sections (33, 34, 35, 36, 37).

6. The shaker bottle (10, 20) according to claim 4, wherein the vessel has five sections (33, 34, 35, 36, 37), of which a first section (33) arranged close to the bottom (17) of the vessel (11) is in abutment with a second section (34), and a second section (34) is in abutment with a third section (35), and a third section (35) is in abutment with a fourth section (36), and a fourth section (36) is in abutment with a fifth section (37), and wherein the fifth section (37) is surrounding the first, the second, the third and the fourth sections and is in engagement with the lid (12) when the shaker bottle (10, 20) is in the folded state.

7. The shaker bottle (10, 20) according to claim 6, wherein the fifth section (37) has threads for engagement with threads of the lid.

8. The shaker bottle (10, 20) according to claim 1, wherein a release of the container (31) is locked in the folded state of the shaker bottle (10, 20).

9. The shaker bottle (10, 20) according to claim 1, further comprising a base (38) integrally made with the bottom (17) of the vessel (11).

10. The shaker bottle (10, 20) according to claim 9, further comprising an accessory compartment (16) having a bottom and an open top, which is removable arranged at the base (38) of the shaker bottle (10, 20) and which accessory compartment (16) is closed by the bottom (17) of the vessel (11).

11. The shaker bottle (10, 20) according to claim 10, wherein threads are arranged around the base (38) for engagement with threads of the accessory compartment (16).

12. The shaker bottle (10, 20) according to claim 10, wherein a connecting ring is arranged around the base (38) for engagement with the accessory compartment (16).

13. The shaker bottle (10, 20) according to claim 1, further comprising a cap (13) for closing the aperture (21), the cap (13) being arranged in engagement with a hook (23) of the lid (12) mounted below the aperture (21) forming a flexible joint with the cap (13).

14. The shaker bottle (10, 20) according to claim 1, wherein the container (31) has a smaller diameter than the lower surface (41) of the lid (12) forming a space around the container (31) for passing liquid in the vessel (11) through the channel (45) and to the aperture (21) for use of the shaker bottle (10, 20) as an liquid bottle in the unfolded state.

* * * * *